US012775147B2

(12) United States Patent
Allen

(10) Patent No.: US 12,775,147 B2
(45) Date of Patent: Oct. 27, 2026

(54) OPTICAL CABLE ORGANIZATION AND MANAGEMENT SYSTEM

(71) Applicant: Samuel D. Allen, Oxford, GA (US)

(72) Inventor: Samuel D. Allen, Oxford, GA (US)

( * ) Notice: Subject to any disclaimer, the term of this patent is extended or adjusted under 35 U.S.C. 154(b) by 222 days.

(21) Appl. No.: 18/371,867

(22) Filed: Sep. 22, 2023

(65) Prior Publication Data

US 2024/0134138 A1 Apr. 25, 2024
US 2024/0231026 A9 Jul. 11, 2024

Related U.S. Application Data

(60) Provisional application No. 63/417,855, filed on Oct. 20, 2022.

(51) Int. Cl.
*G02B 6/44* (2006.01)
*G02B 6/36* (2006.01)

(52) U.S. Cl.
CPC ......... *G02B 6/4447* (2013.01); *G02B 6/3636* (2013.01); *G02B 6/4429* (2013.01)

(58) Field of Classification Search
CPC .......... G02B 6/44
USPC .......... 385/135
See application file for complete search history.

(56) References Cited

U.S. PATENT DOCUMENTS 4,648,168 A * 3/1987 Nolf .......... G02B 6/4439 29/447
5,945,633 A * 8/1999 Ott .......... G02B 6/44526 174/59
6,363,198 B1 3/2002 Braga et al.
7,578,625 B2 * 8/2009 Tanaka .......... G02B 6/3652 385/59
9,529,155 B2 * 12/2016 Bhagavatula .......... G02B 6/32
10,110,311 B1 * 10/2018 Lin .......... G02B 6/4249
10,890,730 B2 * 1/2021 Petersen .......... G02B 6/44715
11,307,372 B2 * 4/2022 Kaplan .......... G02B 6/4453
11,921,334 B2 * 3/2024 Hu .......... G02B 6/4214
11,927,818 B2 * 3/2024 Zheng .......... G02B 6/389
12,130,470 B2 * 10/2024 Polomoff .......... G02B 6/30
12,189,189 B2 * 1/2025 Verheyden .......... G02B 6/3825
2008/0175553 A1 * 7/2008 Hendrickson .......... G02B 6/44715 385/135
2010/0296791 A1 * 11/2010 Makrides-Saravanos .......... G02B 6/4455 385/135

(Continued)

FOREIGN PATENT DOCUMENTS

BR 112019009857 A2 * 8/2019 .......... G02B 6/4454
KR 20160034762 A * 3/2016 .......... G02B 6/46
WO WO-2022076539 A1 * 4/2022 .......... H05K 1/141

*Primary Examiner* — Kaveh C Kianni
(74) *Attorney, Agent, or Firm* — Fulton Jeang PLLC

(57) ABSTRACT

What is disclosed is an optical fiber organization system that includes a generally planar bottom portion having a plurality of linear grooves defined thereon, the plurality of linear grooves being oriented along in parallel along a longitudinal axis. The generally planar top portion is rotatably coupled to the generally planar bottom portion, where the top portion being rotatable between a fully-open position providing access to the plurality of linear grooves and a fully-closed position adapted to securely enclose the plurality of linear grooves. Each of the plurality of linear grooves encased between the top and bottom portions is adapted to accommodate and hold a length of at least one optical fiber extending along the longitudinal axis.

18 Claims, 13 Drawing Sheets

(56) References Cited

U.S. PATENT DOCUMENTS

| | | | | |
|---|---|---|---|---|
| 2011/0115494 | A1* | 5/2011 | Taylor | H01R 24/64 439/490 |
| 2017/0209099 | A1* | 7/2017 | Caron | A61B 5/02154 |
| 2023/0266541 | A1* | 8/2023 | Anderson | G02B 6/3897 385/135 |

* cited by examiner

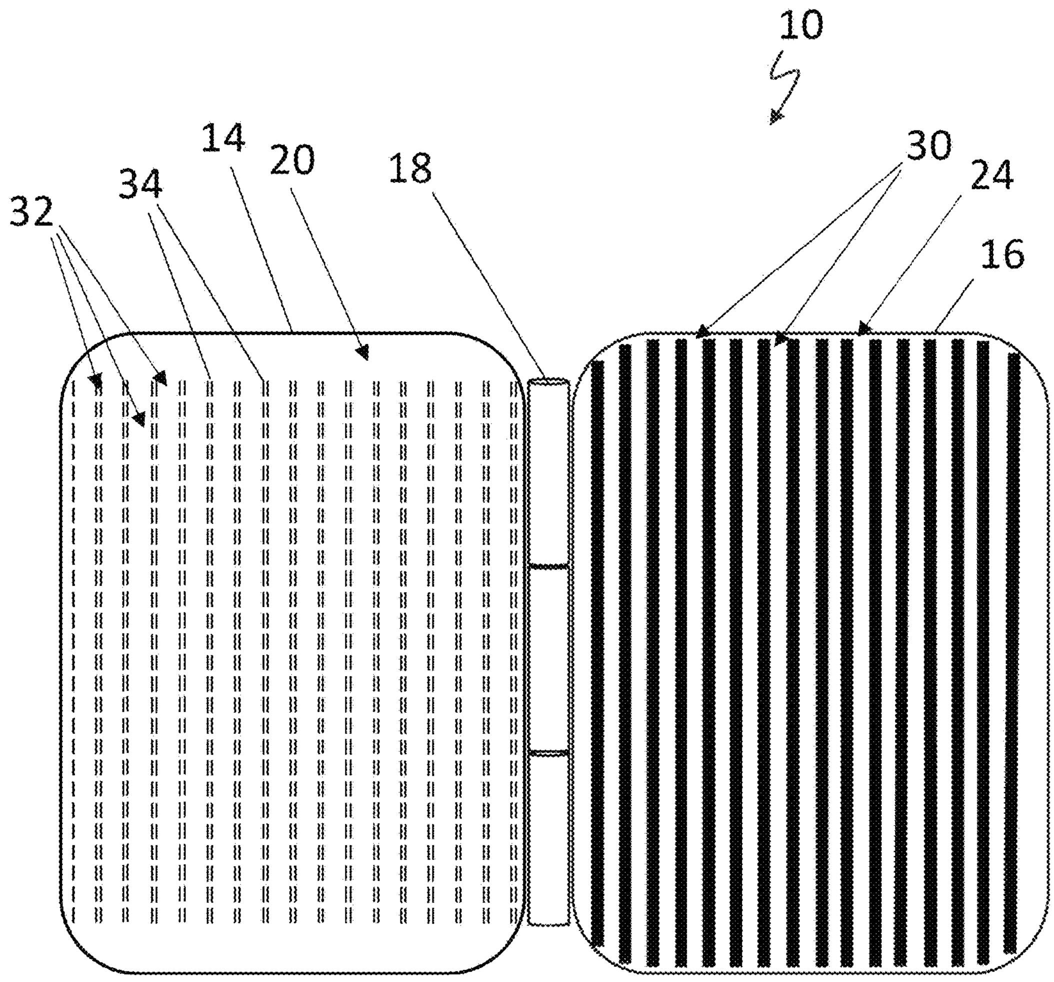
*FIG. 1*
*FIG. 2*
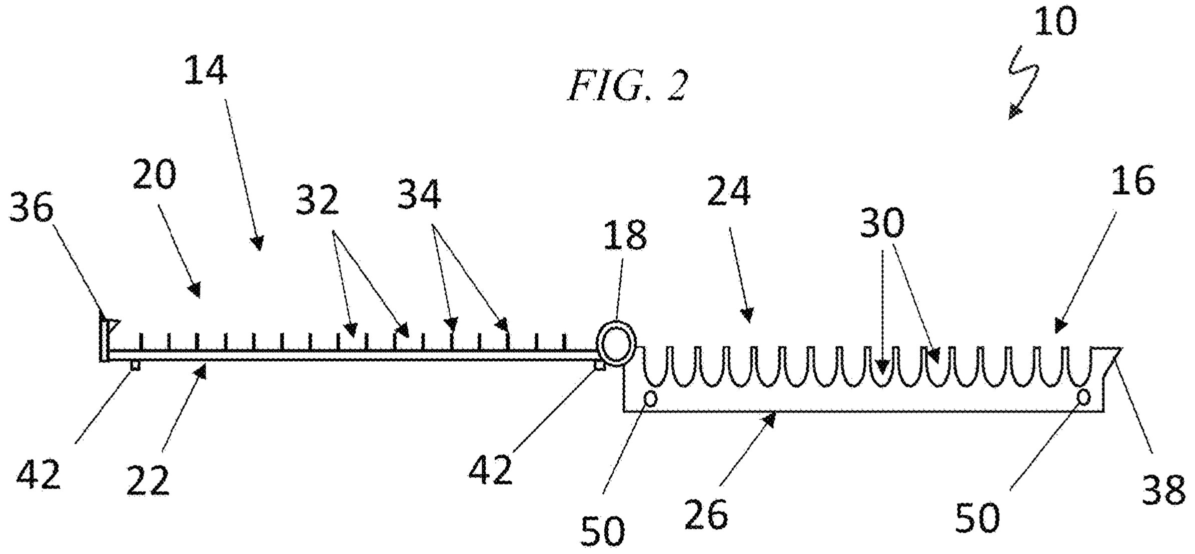

*FIG. 3*
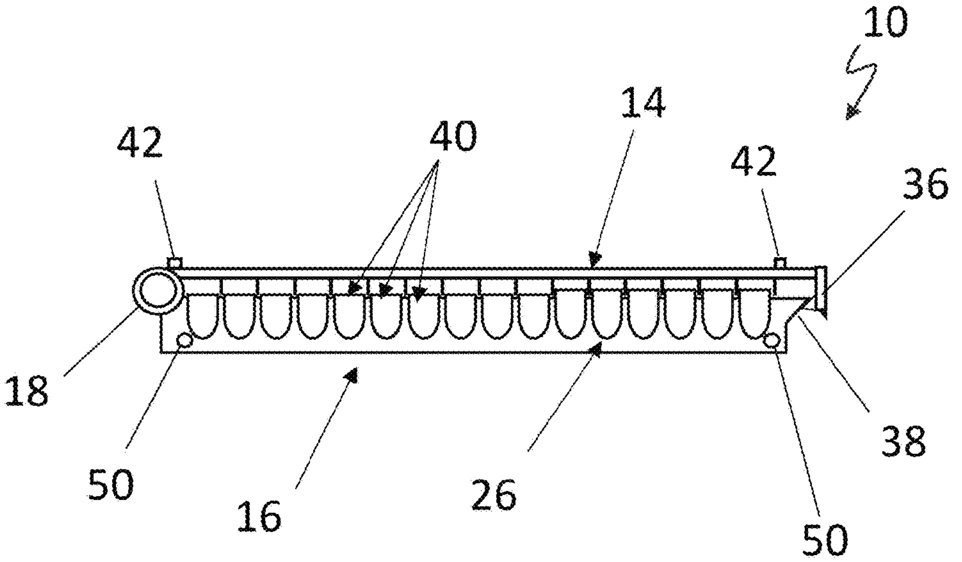
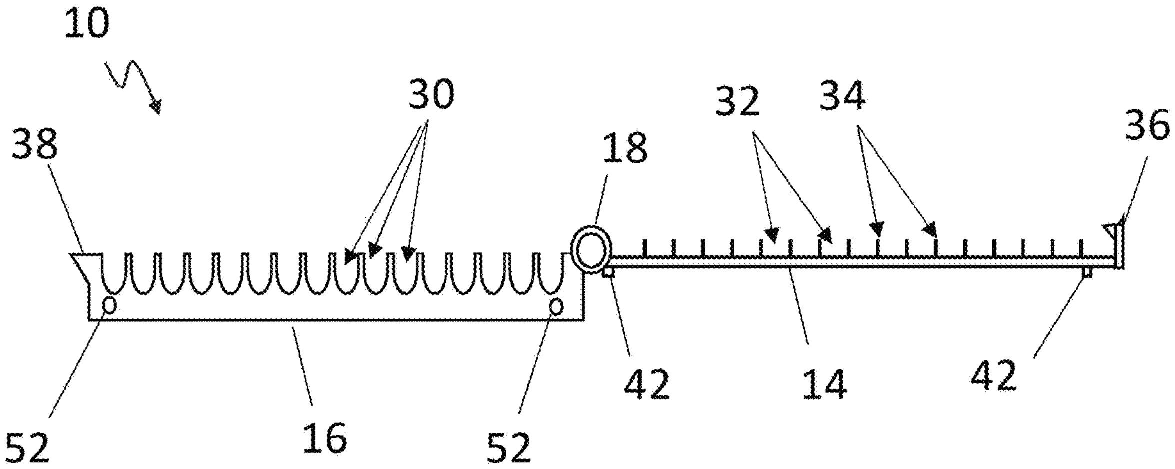
*FIG. 4*
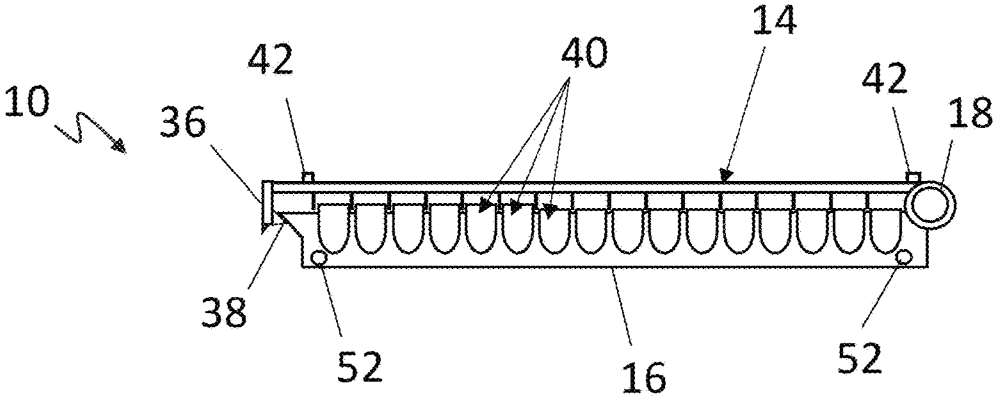
*FIG. 5*

OPTICAL CABLE ORGANIZATION AND MANAGEMENT SYSTEM

RELATED APPLICATION

The present application claims the benefit of U.S. Provisional Patent Application No. 63/417,855 filed on Oct. 20, 2022, which is incorporated herein by reference in its entirety.

FIELD

The present disclosure relates generally to an organizer of optical cables and in particular to an optical fiber cable organization and management system.

BACKGROUND

Optical fiber cables are the workhorse in data communications because light propagates through the fibers at high speed and data rates with less attenuation as compared to electrical signals transmitted in metal wires. Unlike electrical communication modes, light signals are immune to electromagnetic interference, thereby eliminating cross-talk between signals and the effects of environmental noise.

In today's rapidly evolving digital landscape, data centers serve as the beating heart of the modern information age. These colossal facilities house an intricate web of technologies that enable the storage, processing, and dissemination of vast amounts of data. At the core is a network of optical fiber cabling, a critical infrastructure component that is often overlooked but plays an indispensable role in ensuring seamless connectivity and data flow. The sheer volume of optical fiber cabling utilized within a typical data center is staggering, with thousands of kilometers of these delicate threads interconnecting various components and systems. Given the significance of this labyrinthine network, it becomes clear why the meticulous organization and management of optical fiber cabling are of paramount importance in the efficient operation and maintenance of data centers.

To comprehend the magnitude of the optical fiber cabling challenge, consider that a mid-sized data center may encompass more cabling than the combined length of several transcontinental fiber optic communication cables. This vast web of fibers is the lifeblood of data centers, facilitating high-speed data transmission, low-latency communications, and the reliable functioning of myriad IT equipment. However, the substantial quantity of cabling is just one part of the equation; the way these cables are organized and managed within the data center holds equal significance.

Optical fiber cables are delicate and sensitive to external factors such as bending, twisting, and excessive tension. Furthermore, they can be susceptible to dust and contamination, which can degrade signal quality and affect network performance. Optical fiber cables are fragile and easily damaged when tangled during installation, troubleshooting, decommissioning, replacement, and upgrades. Traditionally, technicians have heavily relied on hook-and-loop (e.g., VELCRO) straps to attempt to bundle and tame the masses of cables present in a typical data center. However, these are far from ideal and are expensive consumables that are typically not reusable.

BRIEF DESCRIPTION OF THE DRAWINGS

FIG. 1 is a top plan view of an embodiment of the optical fiber organizer with the lid open according to the teachings of the present disclosure;

FIGS. 2 and 3 are first end views of an embodiment of the optical fiber organizer according to the teachings of the present disclosure;

FIGS. 4 and 5 are second end views of an embodiment of the optical fiber organizer according to the teachings of the present disclosure;

DETAILED DESCRIPTION

Figure 20:
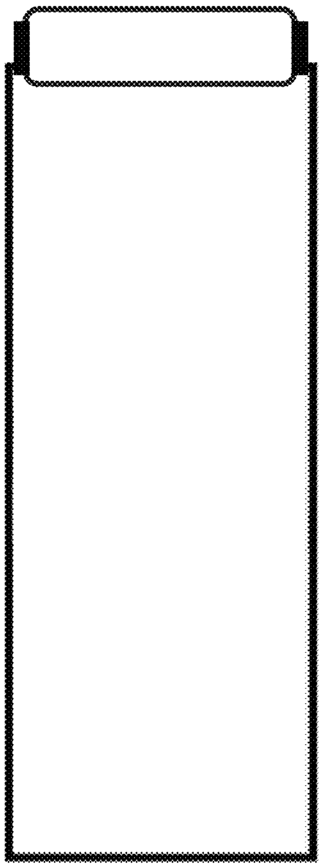
FIGS. 20 and 21 are plan views of an embodiment of an embodiment of the optical fiber comb according to the teachings of the present disclosure.
Figure 21:
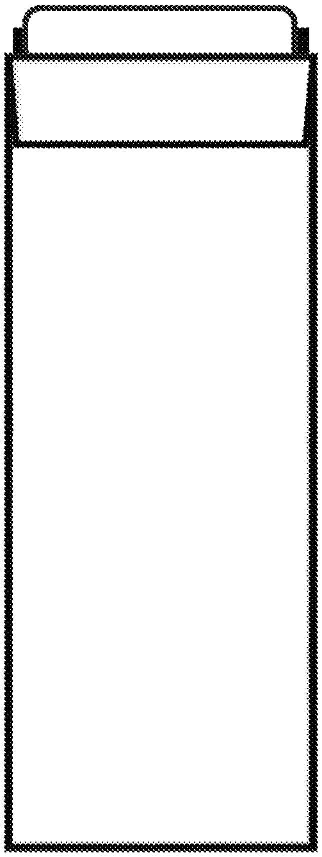
Figure 22:
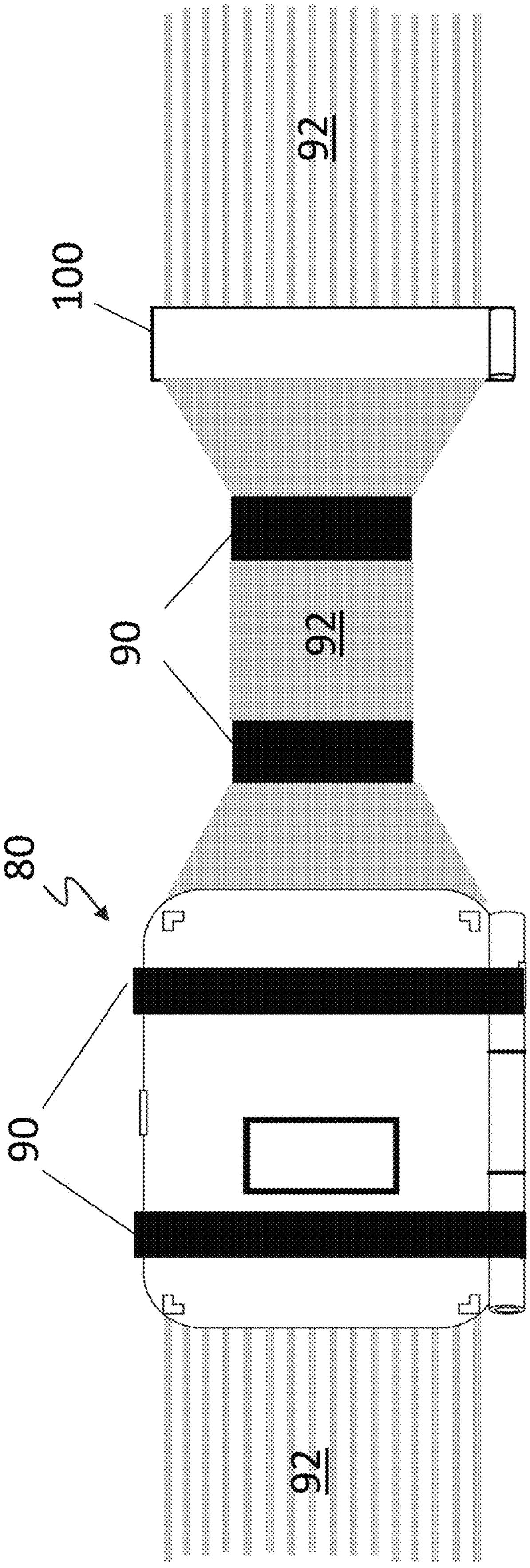
FIG. 22 is a top plan view of an embodiment of a plurality of stacked optical fiber organizers and optical fiber comb shown in use with a plurality of optical cables according to the teachings of the present disclosure.
Figure 23:
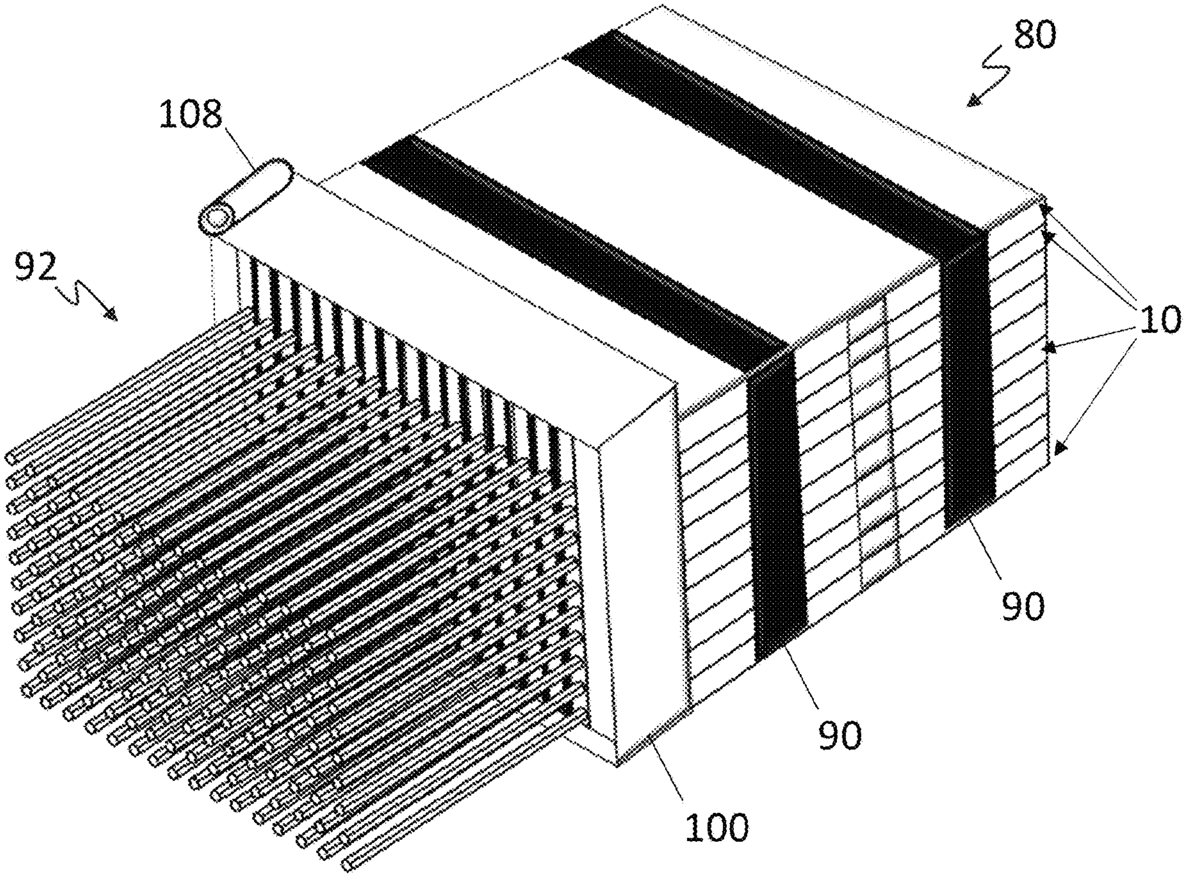
FIG. 23 is a top perspective view of an embodiment of a plurality of stacked optical fiber organizers and optical fiber comb shown in use with a plurality of optical cables according to the teachings of the present disclosure.

By using the optical fiber cable organization and management system that include a fiber organizer 10 and a fiber comb 100 described herein, data centers are able to greatly reduce cost and cut down on the labor time whenever the optical fiber cables need to be installed, handled, and worked on. FIGS. 1-14 present various views of an embodiment of the optical fiber organizer 10 and FIGS. 15-21 present various views of an embodiment of the optical fiber comb 100. Further, FIGS. 22 and 23 show the deployment of a combination of both the fiber organizer 10 and fiber comb 100 to organize and manage a fiber cable trunk.

Referring to FIGS. 1, 2, and 4, the fiber organizer 10 has a lid 14 and a bottom tray 16 that are rotatably coupled by a hinge 18. The lid 14 can be rotated to fully cover and enclose the bottom tray 16. The lid 14 has an inside surface 20 and an outside surface 22, and similarly, the bottom tray has an inside surface 24 and an outside surface 26. Along the entire length of the longitudinal axis of the bottom tray 16 are a plurality of parallel linear grooves 30 that are generally in alignment with a plurality of parallel linear channels 32 defined by a plurality of nodules 34 protruding from the inside surface 20 of the lid 14. The hinge 18 allows the lid 14 to rotate and open to a substantially flat position so that it does not obstruct access to any of the grooves 30. In another embodiment, the inside surface 20 of the lid 14 also has parallel linear grooves similar to those found in the bottom tray 16.

As shown in FIGS. 3 and 5, when the lid 14 of the fiber organizer 10 is closed, a locking clip 36 configured at the edge of the lid 14 opposite of the hinge 18 engages the catch 38 configured at the edge of the bottom tray 16 opposite of the hinge 18. The fiber organizer 10 stays closed until the clip 36 is releases or disengages the catch 38. The combination of the channels 32 formed by the nodules 34 on the inside surface 20 of the lid 14 and the grooves 30 disposed on the inside surface 24 of the bottom tray 16 result in a plurality of enclosed linear passageways 40 that extend the entire length of the fiber organizer 10. When the lid 14 is securely latched, these linear passageways 40 are designed to fully encase around and house a plurality of optical fibers 92 in an organized manner and keep them straight and free of tangles.

Figure 6:
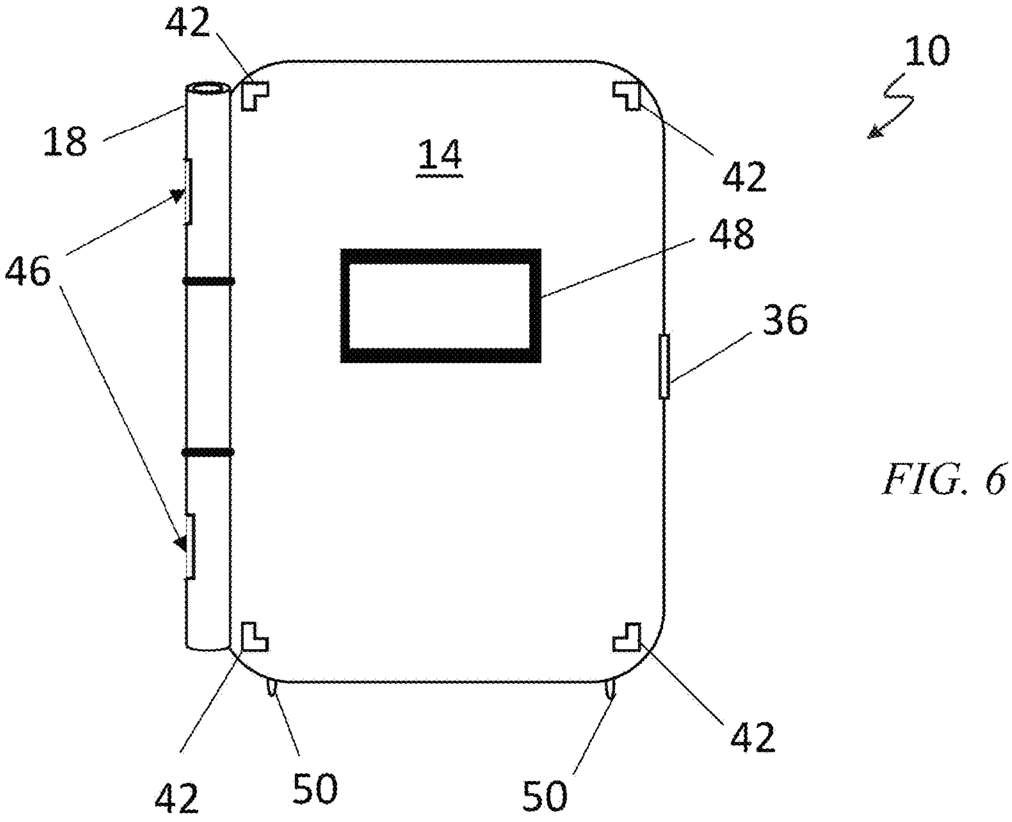
FIGS. 6 and 7 are a top plan view of and a bottom plan view of an embodiment of the optical fiber organizer with the lid closed according to the teachings of the present disclosure.
Figure 7:
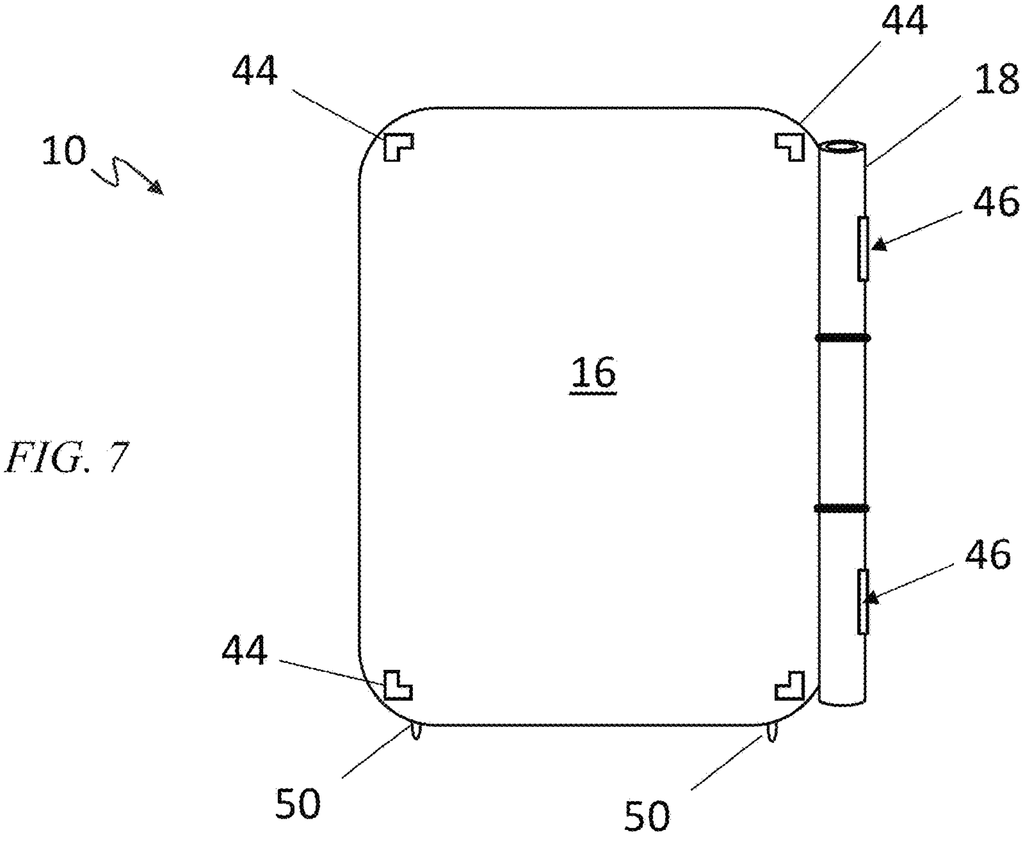
Figure 8:
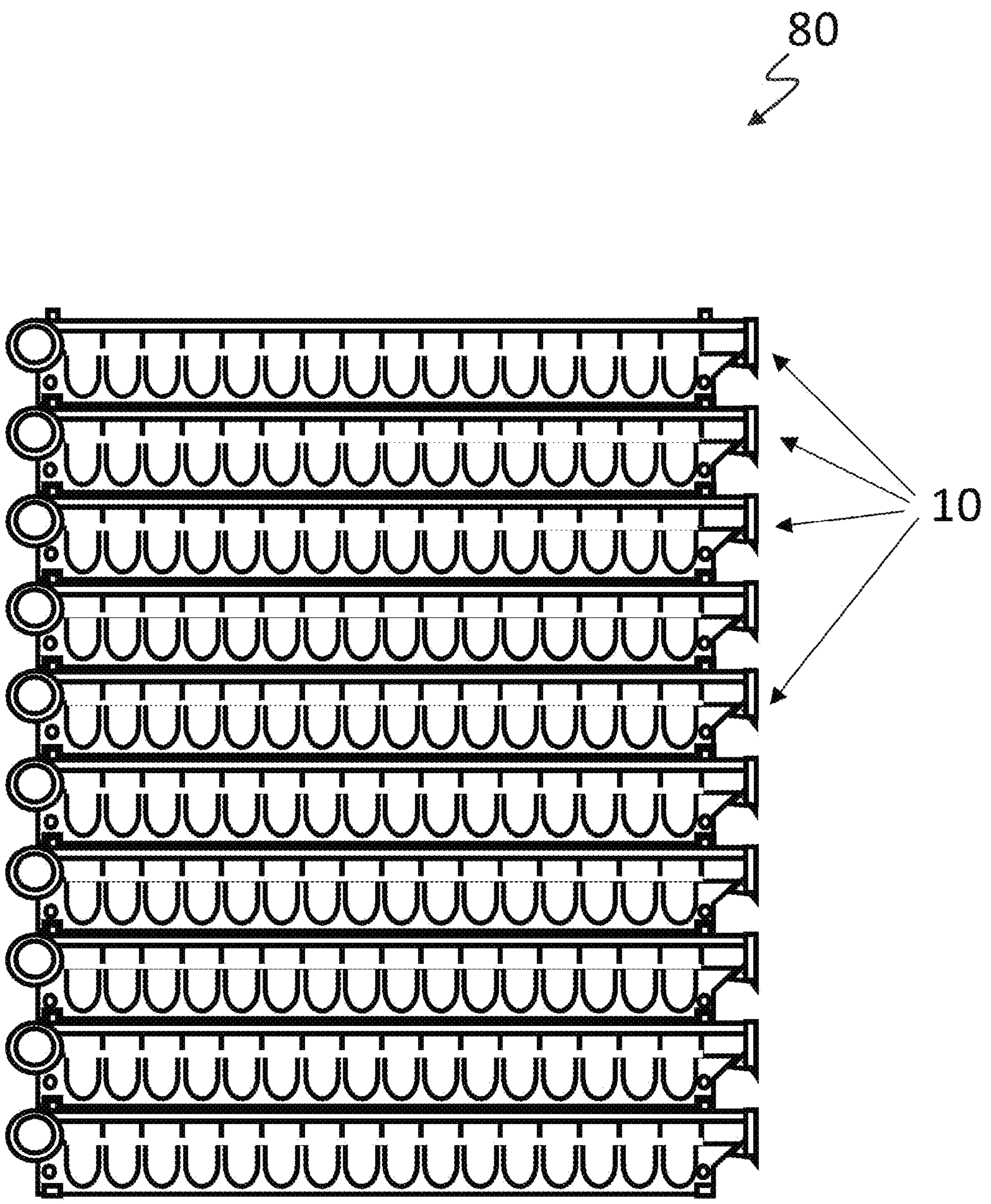
FIG. 8 is an end view of a plurality of stacked optical fiber organizers according to the teachings of the present disclosure.
Figure 9:
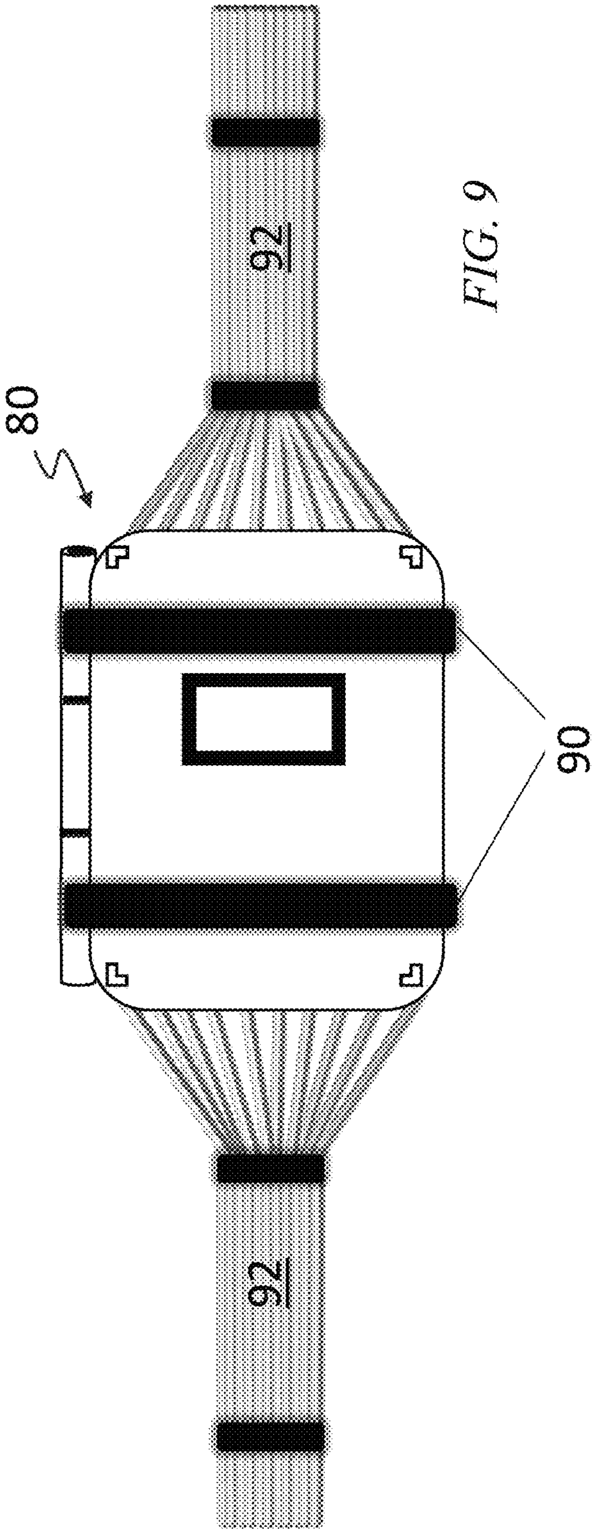
FIG. 9 is a top plan view of a plurality of stacked optical fiber organizers shown in use with a plurality of optical fibers according to the teachings of the present disclosure.
Figure 10:
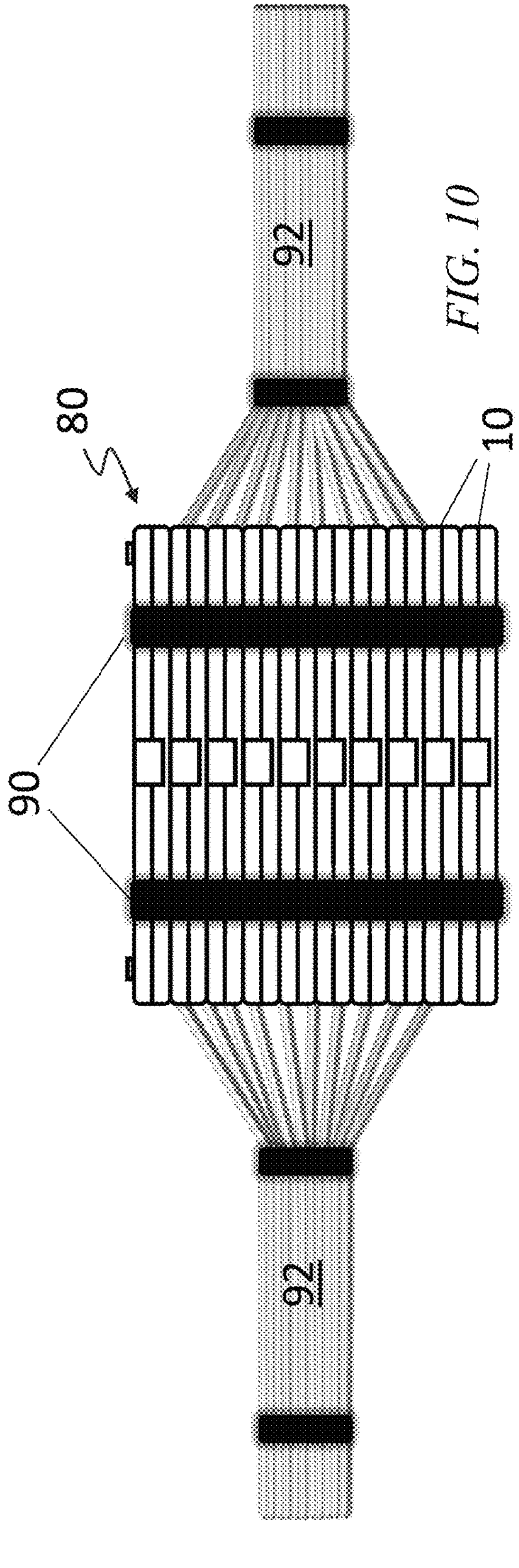
FIG. 10 is a side view of a plurality of stacked optical fiber organizers shown in use with a plurality of optical fibers according to the teachings of the present disclosure.

As shown in FIGS. 6 and 7, a top plan view and a bottom plan view of the fiber organizer 10 are shown, respectively. One or more corners on the outside surfaces 22 and 26 of the lid 14 and bottom tray 16, respectively, feature mated notches 42 and grooves 44 that make it easy to align and stack multiple fiber organizers 10 to form a stack 80 of fiber organizers 10 such as shown in FIG. 8. The corner notches 42 and grooves 44 are preferably L-shaped to permit engagement of adjacent ones of the fiber organizers 10 in the stack 80 and prevent lateral displacement in both the X and Y directions. Further, one or more notches 46 are formed on the outer edge of the hinge 18 that serve to hold and engage hook-and-loop straps 90 that can be used to securely bundle the stack 80 of fiber organizers 10 holding a plurality of optical fibers 92, as shown in FIGS. 9 and 10. Each fiber organizer 10 also includes a label holder 48 with a clear window is disposed on the outside surface 22 of the lid 14 to allow the insertion of an identification label that can be marked to clearly identify the optical cables housed in each fiber organizer 10.

Figure 11:
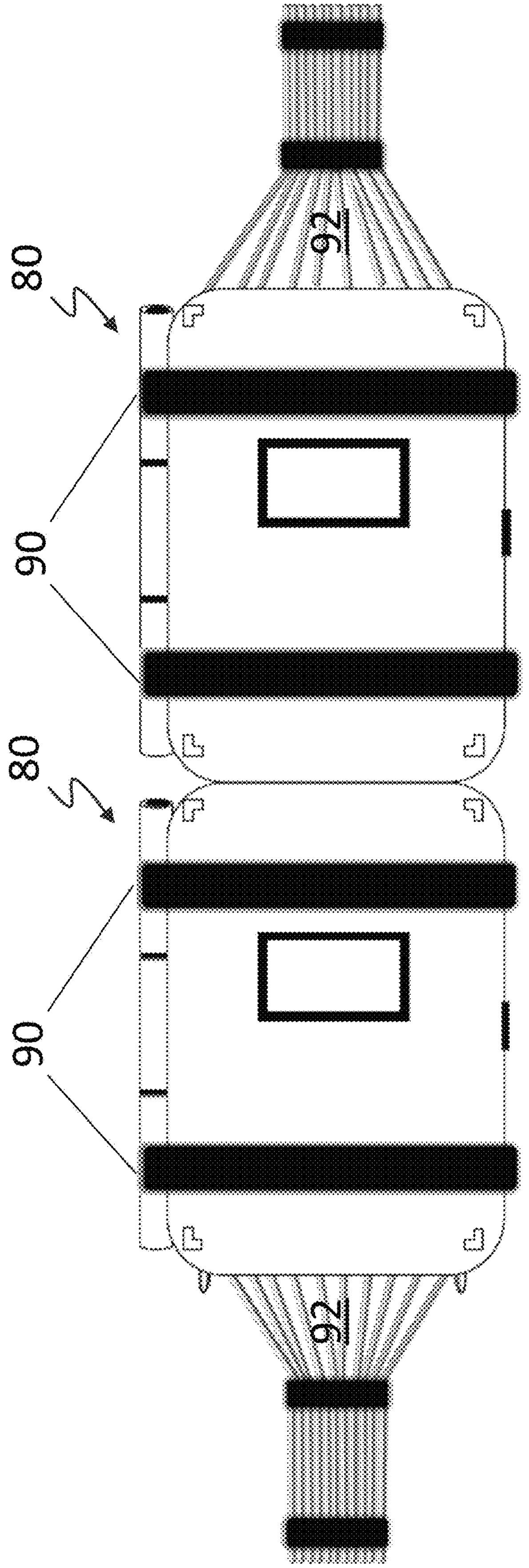
FIG. 11 is a top plan view of an embodiment of two optical fiber organizers connected in series shown in use with a plurality of optical fibers according to the teachings of the present disclosure.
Figure 12:
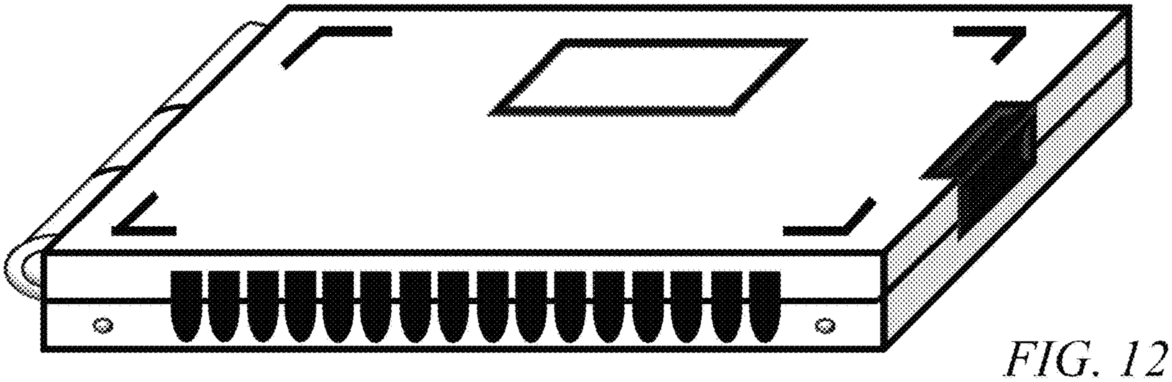
FIGS. 12-14 are top perspective view, front plan view, and back plan view of an embodiment of an optical fiber organizer according to the teachings of the present disclosure.
Figure 13:
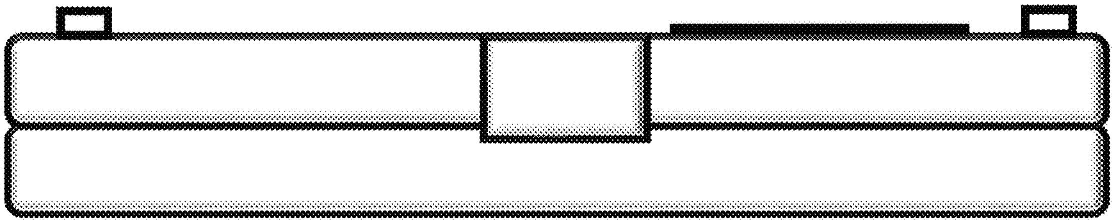
Figure 14:
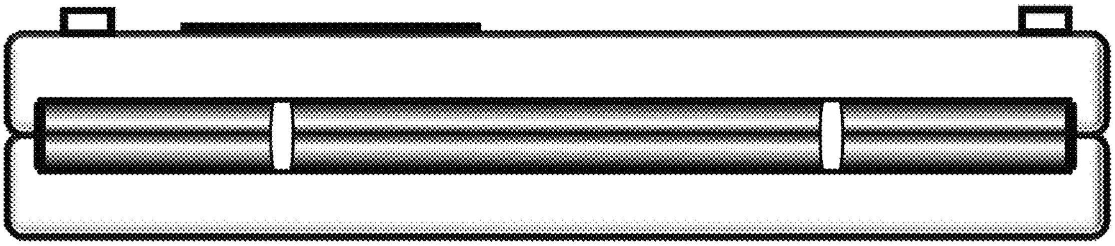

Best shown in FIGS. 2-5 are the guide pins 50 and pin holes 52 that are disposed on the end sides of the fiber organizer 10. The guide pins 50 are positioned and sized to engage the pin holes 52 so that additional fiber organizers 10 can be oriented in linear alignment to receive substantial lengths of a plurality of optical cables 92. Once the cables 92 are positioned and secured within the grooves in each layer of the series of stacked fiber organizers 10, the fiber organizers 10 can be bundled to form stacks 80. Using these guide pins 50 and pin holes 52, a series of fiber organizer stacks 80 can be oriented in linear alignment to receive substantial lengths of a plurality of optical cables 92, such as shown in FIG. 11. Each stack 80 of fiber organizers can then be slid into proper placement along the lengths of the cables inside a cabinet or other structures. FIGS. 12-14 provide additional views of the optical fiber organizer 10.

Figure 15:
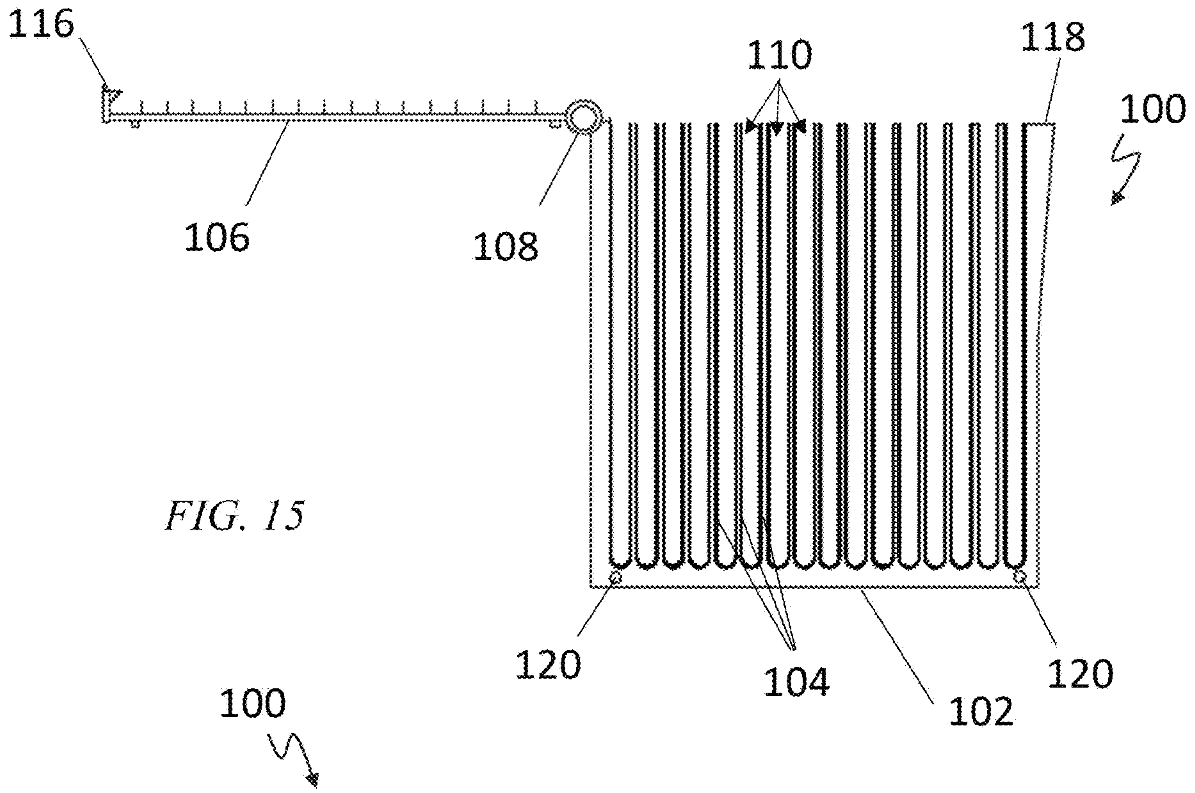
FIGS. 15 and 16 are first and second end views of an embodiment of the optical fiber comb with the lid open according to the teachings of the present disclosure.
Figure 16:
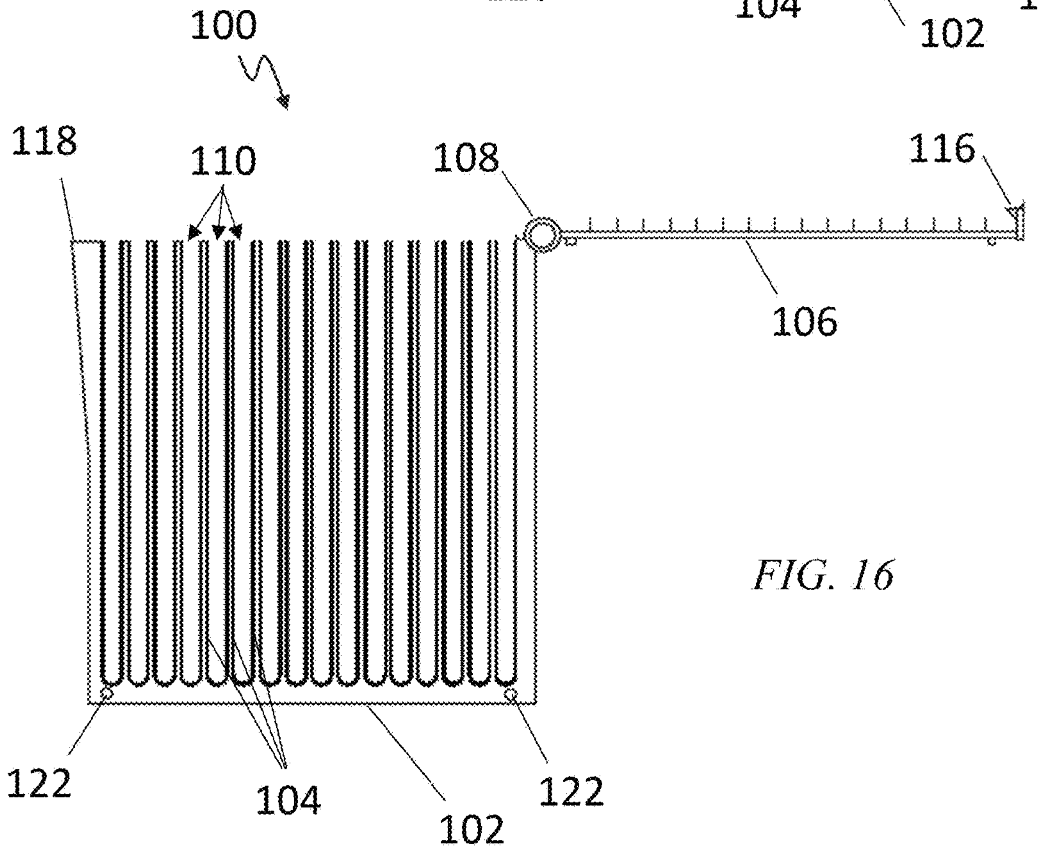
Figure 17:
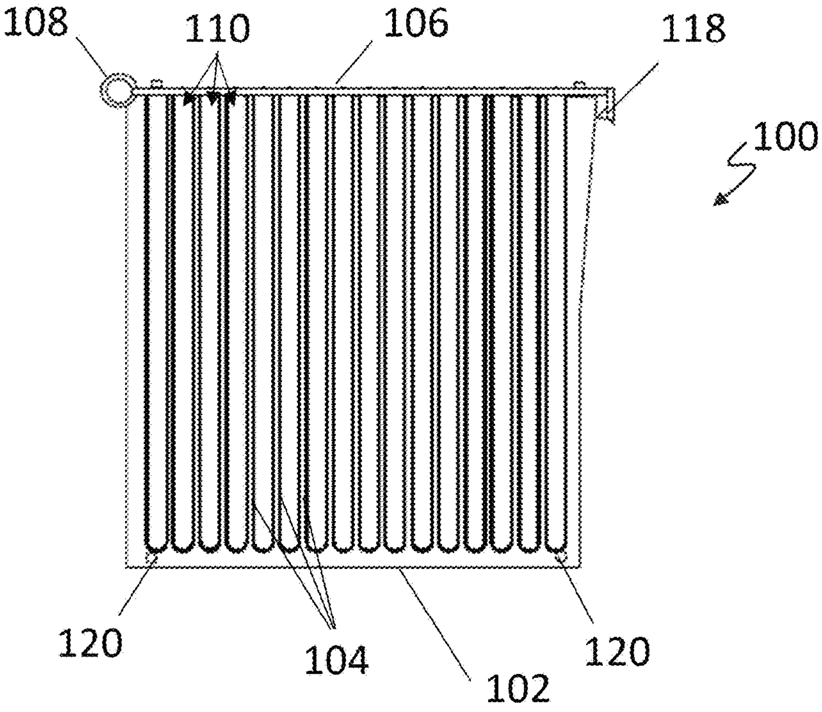
FIGS. 17 and 18 are first and second end views of an embodiment of the optical fiber comb with the lid closed according to the teachings of the present disclosure.
Figure 18:
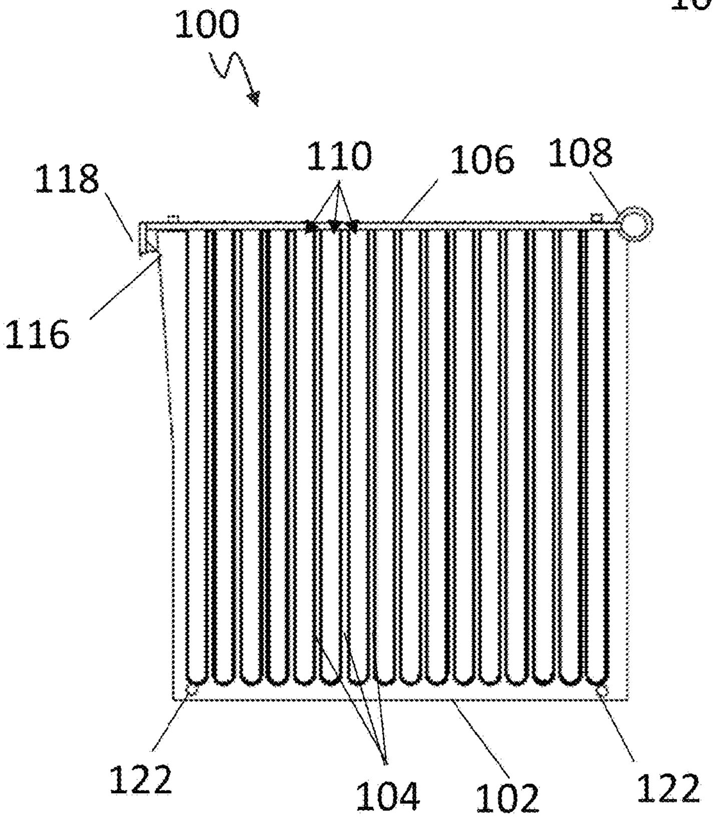
Figure 19:
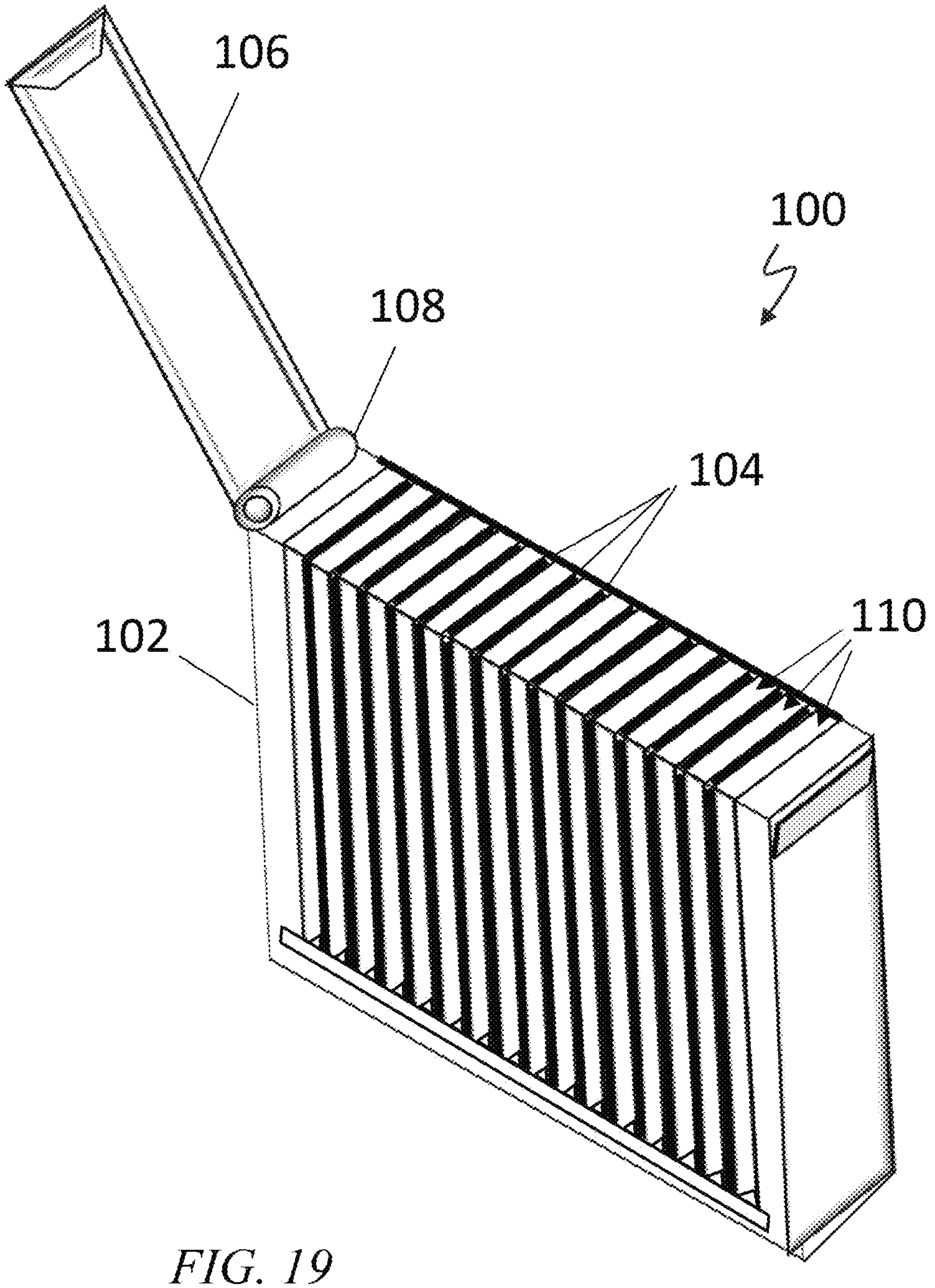
FIG. 19 is a top perspective view of an embodiment of the optical fiber comb with the lid open according to the teachings of the present disclosure.

A second component of the optical fiber organization system is the fiber comb 100. FIGS. 15 and 16 are first and second end views of an embodiment of a fiber comb 100 according to the teachings of the present disclosure. The fiber comb 100 is preferably used in combination with the fiber organizer 10 where needed. The fiber comb 100 includes a bottom portion 102 with a plurality of teeth 104 extending substantially perpendicularly therefrom, and a lid portion 106 coupled to the bottom portion 102 by a rotatable hinge 108. FIGS. 15, 16, and 19 show various views of the fiber comb 100 with its lid portion 106 open. The plurality of teeth 104 are spaced apart from one another and define a plurality of linear spaces forming a plurality of linear channels 110 having a width that is sized to accommodate the fibers or cables that will be stacked and held between the teeth 104 of the fiber comb 100. The hinge 108 allows the lid portion 106 to rotate and open to a substantially flat position so that it does not obstruct access to any of the spaces 110 between the teeth 104 of the comb 100.

When the lid 106 of the fiber comb 100 is closed (FIGS. 17 and 18), a locking clip 116 configured at the edge of the lid 106 opposite of the hinge 108 engages the catch 118 configured at the upper edge of the bottom portion 102 opposite of the hinge 108. The lid portion 106 of the fiber comb 100 stays securely closed holding the optical fibers within the channels 110 until the clip 116 is forced to release or disengage the catch 118. FIGS. 20 and 21 show two plan views of an embodiment of the fiber comb 100 according to the teachings of the present disclosure.

Similar to the fiber organizer 10, the fiber comb 100 also features guide pins 120 and pin holes 122 that are disposed on the end sides of the fiber comb 100. The guide pins 120 are positioned and sized to engage the pin holes 122 so that a series of fiber combs 100 or one or more fiber combs 100 and one or more fiber organizer stacks 80 can be oriented in linear alignment to receive significant lengths of a plurality of optical cables 92, such as shown in FIGS. 22 and 23. In deployment, the fiber organizer stack 80 can be positioned proximate to the fiber comb 100 (FIG. 22) or spaced apart from the fiber comb 100 (FIG. 23).

It should be noted that although the description herein focuses on the management of optical fiber cables in the context of data centers, the fiber organizer and fiber comb described herein can be deployed to organize and manage other types of cables in other suitable applications. The fiber organizer and fiber comb described herein may be constructed of any suitable durable material that is able to maintain its shape without bending and twisting so that the optical fibers encased therein are adequately protected. Suitable materials may include plastic, metal, composites, etc.

The features of the present invention which are believed to be novel are set forth below with particularity in the appended claims. However, modifications, variations, and changes to the exemplary embodiments of the optical fiber cable organization and management system described above will be apparent to those skilled in the art, and the described herein thus encompasses such modifications, variations, and changes and are not limited to the specific embodiments described herein.

What is claimed is:

1. An optical fiber organization system comprising:

a fiber organizer comprising:

a generally planar bottom portion having a plurality of linear grooves defined thereon, the plurality of linear grooves being oriented along in parallel along a first axis of the fiber organizer and each of the plurality of linear grooves being adapted to accommodate and encase a length of a single optical fiber extending along the first axis of the fiber organizer;

a generally planar top portion being rotatably coupled to the generally planar bottom portion of the fiber organizer, the top portion being rotatable between a fully-open position providing access to the plurality of linear grooves and a fully closed position adapted to securely enclose a plurality of optical fibers encased within the plurality of linear grooves defined in the bottom portion of the fiber organizer;

a latch disposed on an edge of the top portion of the fiber organizer adapted securely engage a catch disposed on an outer edge of the bottom portion to maintain the fully-closed position of the top portion of the fiber organizer over the bottom portion of the fiber organizer; a stacking guide disposed on outer surfaces of the top and bottom portions of the fiber organizer for facilitating alignment of a plurality of fiber organizers in stacked orientation and inhibit lateral displacement of any fiber organizer from the stacked orientation; and a longitudinal alignment guide disposed on outer surfaces of the bottom portion of the fiber organizer for facilitating alignment of a series of fiber organizers longitudinally in an end-to-end orientation; and a fiber comb for deployment with a plurality of fiber organizers in a stacked orientation, the fiber comb comprising:

a generally planar bottom portion having a plurality of linear grooves defined thereon, the plurality of linear grooves being oriented along in parallel along a first axis of the fiber comb and each of the plurality of linear grooves being adapted to accommodate and encase a length of a plurality of optical fibers extending along the first axis of the fiber comb;

a generally planar top portion of the fiber comb being rotatably coupled to the generally planar bottom portion of the fiber comb, the top portion being rotatable between a fully-open position providing access to the plurality of linear grooves and a fully-closed position adapted to securely enclose the plurality of optical fibers encased within the plurality of linear grooves of the fiber comb;

a latch disposed on an edge of the top portion of the fiber comb adapted to securely engage a catch disposed on an outer edge of the bottom portion of the fiber comb to maintain the fully-closed position of the top portion of the fiber comb over the bottom portion of the fiber comb; and a longitudinal alignment guide disposed on outer surfaces of the fiber comb for facilitating longitudinal alignment of a fiber comb with the plurality of fiber organizers in a stacked orientation.

2. The optical fiber organization system of claim 1, wherein the longitudinal alignment guide of the fiber organizer and the fiber comb comprises guide pins and pin holes.

3. The optical fiber organization system of claim 1, wherein the stacking guide of the fiber organizer comprises L-shaped corner grooves and notches disposed on the top and bottom surfaces of the fiber organizer.

4. The optical fiber organization system of claim 1, wherein an outer edge of the fiber organizer has defined thereon at least one notch adapted to engage at least one strap used to securely bundle the plurality of fiber organizers in a stacked orientation.

5. The optical fiber organization system of claim 1, wherein an outer surface of the top portion of the fiber organizer comprises an identification label holder.

6. An optical fiber organization system comprising:

a fiber organizer comprising:

a generally planar bottom portion having a plurality of linear grooves defined thereon, the plurality of linear grooves being oriented along in parallel along a first axis of the fiber organizer and each of the plurality of linear grooves being adapted to accommodate and encase a length of a single optical fiber extending along the first axis of the fiber organizer;

a generally planar top portion being rotatably coupled to the generally planar bottom portion of the fiber organizer, the top portion being rotatable between a fully-open position providing access to the plurality of linear grooves and a fully closed position adapted to securely enclose a plurality of optical fibers encased within the plurality of linear grooves defined in the bottom portion of the fiber organizer;

a latch disposed on an edge of the top portion of the fiber organizer adapted securely engage a catch disposed on an outer edge of the bottom portion maintain the fully-closed position of the top portion of the fiber organizer over the bottom portion of the fiber organizer;

a stacking guide disposed on outer surfaces of the top and bottom portions of the fiber organizer for facilitating alignment of a plurality of fiber organizers in stacked orientation and inhibit lateral displacement of any fiber organizer from the stacked orientation; and a longitudinal alignment guide disposed on outer surfaces of the bottom portion of the fiber organizer for facilitating alignment of a series of fiber organizers longitudinally in an end-to-end orientation.

7. The optical fiber organization system of claim 6, further comprising:

a fiber comb for deployment with a plurality of fiber organizers in a stacked orientation, the fiber comb comprising:

a generally planar bottom portion having a plurality of linear grooves defined thereon, the plurality of linear grooves being oriented along in parallel along a first axis of the fiber comb and each of the plurality of linear grooves being adapted to accommodate and encase a length of a plurality of optical fibers extending along the first axis of the fiber comb;

a generally planar top portion of the fiber comb being rotatably coupled to the generally planar bottom portion of the fiber comb, the top portion being rotatable between a fully-open position providing access to the plurality of linear grooves and a fully-closed position adapted to securely enclose the plurality of optical fibers encased within the plurality of linear grooves of the fiber comb;

a latch disposed on an edge of the top portion of the fiber comb adapted to securely engage a catch disposed on an outer edge of the bottom portion of the fiber comb to maintain the fully-closed position of the top portion of the fiber comb over the bottom portion of the fiber comb; and a longitudinal alignment guide disposed on outer surfaces of the fiber comb for facilitating longitudinal alignment of a fiber comb with the plurality of fiber organizers in a stacked orientation.

8. The optical fiber organization system of claim 7, wherein the longitudinal alignment guide of the fiber organizer and the fiber comb comprises guide pins and pin holes.

9. The optical fiber organization system of claim 6, wherein the stacking guide of the fiber organizer comprises L-shaped corner grooves and notches disposed on the top and bottom surfaces of the fiber organizer.

10. The optical fiber organization system of claim 6, wherein an outer edge of the fiber organizer has defined thereon at least one notch adapted to engage at least one strap used to securely bundle the plurality of fiber organizers in a stacked orientation.

11. The optical fiber organization system of claim 6, wherein an outer surface of the top portion of the fiber organizer comprises an identification label holder.

12. An optical fiber organization system comprising:

a fiber organizer having a generally planar bottom portion having a plurality of linear grooves defined thereon, the plurality of linear grooves being oriented along in parallel along a longitudinal axis;

the fiber organizer having a generally planar top portion being rotatably coupled to the generally planar bottom portion, the top portion being rotatable between a fully-open position providing access to the plurality of linear grooves and a fully-closed position adapted to securely enclose the plurality of linear grooves, and a latch disposed on an edge of the top portion adapted to securely engage a catch disposed on an outer edge of the bottom portion to maintain the fully-closed position of the top portion over the bottom portion; and wherein each of the plurality of linear grooves encased between the top and bottom portions is adapted to accommodate and hold a length of at least one optical fiber laid substantially linearly within the linear groove and extending beyond the fiber organizer along the longitudinal axis.

13. The optical fiber organization system of claim 12, wherein each of the plurality of linear grooves is adapted to accommodate and hold at least two optical fibers extending beyond the fiber organizer along the longitudinal axis of the linear grooves.

14. The optical fiber organization system of claim 12, wherein a stacking guide is disposed on outer surfaces of the top and bottom portions for facilitating alignment of a plurality of fully-closed top and bottom portions in a stacked orientation and inhibit lateral displacement from the stacked orientation.

15. The optical fiber organization system of claim 14, wherein an outer edge of the fiber organizer has defined thereon at least one notch adapted to engage at least one strap used to securely bundle the plurality of fully-closed top and bottom portions in the stacked orientation.

16. The optical fiber organization system of claim 12, further comprising a longitudinal alignment guide disposed on outer surfaces of the bottom portion for facilitating alignment of a series of fully-closed top and bottom portions longitudinally in an end-to-end orientation.

17. The optical fiber organization system of claim 12, wherein an outer surface of the top portion comprises an identification label holder.

18. The optical fiber organization system of claim 12, wherein each of the plurality of linear grooves is adapted to accommodate and hold at least three optical fibers within the linear grooves and extending beyond the fiber organizer.

* * * * *